No. 890,068.

PATENTED JUNE 9, 1908.

D. KNOWLTON.
JAR CLOSURE.
APPLICATION FILED JAN. 25, 1907.

Inventor
Dallas Knowlton
By Joseph W. Buell
his Attorney

Witnesses

UNITED STATES PATENT OFFICE.

DALLAS KNOWLTON, OF WASHINGTON, DISTRICT OF COLUMBIA.

JAR-CLOSURE.

No. 890,068.　　　　Specification of Letters Patent.　　　　Patented June 9, 1908.

Application filed January 25, 1907. Serial No. 354,010.

*To all whom it may concern:*

Be it known that I, DALLAS KNOWLTON, a citizen of the United States, residing at the city of Washington, in the District of Columbia, have invented certain new and useful Improvements in a Jar-Closure, of which the following is a specification.

My invention relates especially to closures for glass jars or bottles though it is applicable to other vessels of simple construction.

The object of this invention is to provide a simple and inexpensive closure, the clamping means of which is adapted to automatically adjust itself to an increasing pressure, upon rotating the same by bringing into more forcible contact an exclusive central bearing on the cap of the jar and a broader bearing of the engaging fingers or jaw members in their engagement with the jar.

Figure 1:
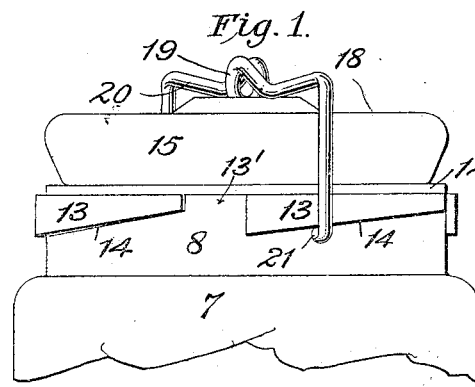
Figure 2:
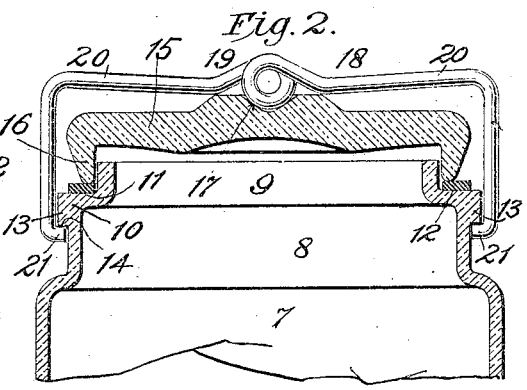
Figure 3:
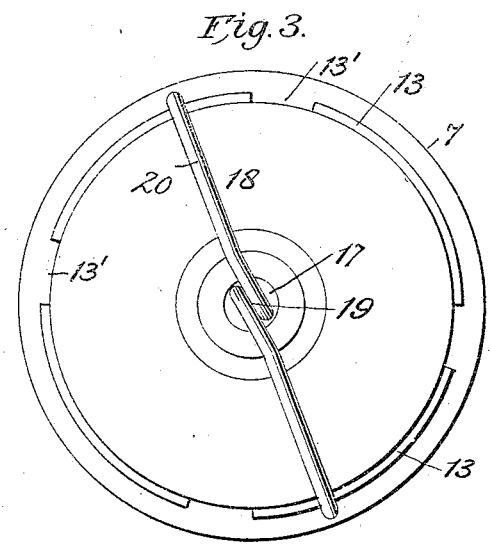
Figure 4:
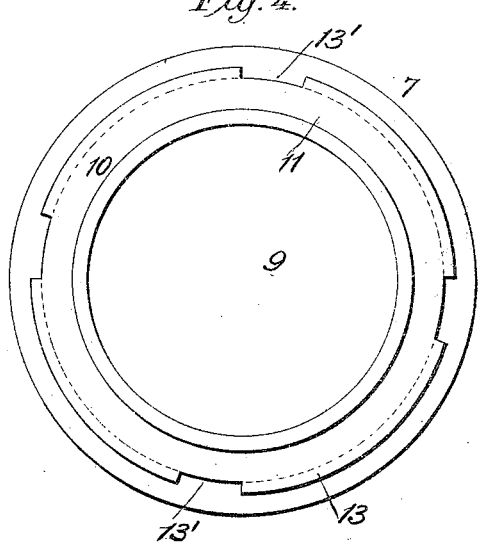

Referring to the accompanying drawings, Figure 1, represents a side elevation of the upper portion of a jar. Fig. 2 represents a like view in section. Fig. 3, represents a top plan view of the jar with closure devices shown in place and applied, while Fig. 4, shows a similar view to that of Fig. 3, with the closure devices removed.

Like numerals indicate corresponding parts in the several figures.

Referring to the drawings by numeral,—7, designates the upper portion of a jar, that is made preferably of glass pressed into shape and which is shown as having formed on its neck 8, a short distance below the top thereof, and the mouth 9, an annular rim or flange 10, the upper horizontal face of which serves to form a peripheral seat 11, that extends in a horizontal plane to provide a seat for a rubber gasket or washer 12, which is preferably angular in cross-section, as shown.

At equal intervals or points apart from each other upon the outer circumferences of the neck of the jar, there is provided a corresponding series of locking lugs or bosses which are formed integral with the jar, while the under edges or working-faces extend to provide an inclined way or bead 14. These inclined ways are adapted to be engaged by the fastening or clamping device to be presently described.

15, designates a cover or cap, that is preferably made of glass, and which is provided with an integral depending annular flange 16, of a diameter to fit snugly about the upper edge of the neck of the jar and that is adapted to be seated to compress the packing or rubber gasket 12, upon and against the shoulder or seat 11, of the flange 10. Thus there is provided an air-tight joint between the cover and jar when the same is held thereon by a forcible contact therewith by the type of fastening means I employ.

In this invention it is proposed to obtain an exclusive central bearing on the cap 15, because it insures the bearing of the flange 16, on every part of the rubber gasket with uniform pressure, whereas if the pressure is applied directly to the outer edge of the glass cap it becomes impossible to produce an equal pressure upon the rubber gasket by reason of the inequalities to be found on the working faces due either to a variance in the thickness of the caps, the thickness of the rubbers, or a thickness variance of the jars at the bearing points. With a central pressure exerted as proposed all of these difficulties are overcome.

Besides obtaining a central bearing it is the purpose of this invention to provide a clamping device or fastening means that can be made of wire and is so shaped as to present a central engaging member and terminating in opposing fingers or jaws.

The cap may be formed with a flat top or one raised centrally as shown, to add to the strength thereof, and is centrally recessed to provide a depression or cup 17, which receives about one-half, more or less of the engaging portion of a revoluble clamping or locking means, when the same is mounted thereon.

The fastening means or clamping member 18, is shown as consisting of a single piece of stiff wire having spring temper, that is bent upon itself in such a way as to form centrally at a point intermediate of its ends by a single convolution or strand, a circular bend or coil 19. This bend is made to extend vertically and terminates in spring-lever arms 20, that extend in opposite directions, in a substantially horizontal plane. The outer portions of the arms 20 are bent into a vertical plane in a manner, that when in position as applied to the jar, they pass over the edge of the cover upon directly opposite sides thereof, while the free ends of said arms 20, are bent inwardly at right angles to provide short engaging fingers or jaws 21.

The advantage to be derived from the employment of fingers projecting in the manner just described is that as the clamping device is rotated the fingers in their engagement with the inclined way 14 are not only brought into forcible contact therewith but the fingers are gradually forced toward each other and thereby obtain a greater surface bearing or seat on the inclined ways, respectively.

By the employment of such a construction and arrangement of parts there is provided a clamping and locking means that possesses the mechanical advantage of employing the principle of an exclusive central bearing with a forcible pressure that is accomplished with spring-leverage exerted from the edges of the jar to the center by reason of the arms of the clamp co-acting with the inclined plane of the locking lugs, whereas the pressure exerted may be regulated by the distance the arms are rotated with relation to said inclined planes.

From the foregoing described clamp construction it will be seen that there is not only produced a unitary structure that is simple and cheap but there is also produced one in which the central bearing coil is mounted to bear centrally on the cap in a plane suitable to the thrust exerted, whereby it can accommodate itself to the varying pressures exerted through the spring-lever arms, without yielding because the greater the pressure brought to bear thereon, the more the tensional strain will contract the coil in diameter and the more unyielding it will become, because its tension and resistance capacity is thereby increased, whereas if simply a strand of wire were depended upon at that point it would readily stretch and yield, and therefore the latter would be unreliable.

To accomplish the stopping and sealing of the jar the cap is first placed upon its mouth in a manner to allow its lower edge to seat on the rubber gasket, while the circular bend 19, is placed in the depression, and the arms of the clamp are brought to a point to register with the spaces indicated at 13′, that are located, respectively, opposite each other, to allow of the seating of the circular bend in the depression, whereupon the clamp is turned to engage, with the fingers 21, at right-angles the inclined ways, which engagement increases in contact area as the clamp is rotated, until a considerable pressure has been exerted on said cap through the said arms.

The clamp can be as readily removed by unturning the clamp. It will also be seen from the foregoing description that my improved jar closure requires only two independent parts, namely a cap and a clamp, and that these parts are extremely simple in construction and operation, while being very efficient.

Having fully described my invention, what I desire to claim as new and useful is:

1. In a bottle, jar or the like, the combination with the neck thereof having externally inclined-way bearing faces, and a cap, of a clamping device comprising two clamping wire members united by a coil of a single turn that diminishes in diameter under stress, and which forms an exclusive central bearing on said cap, said clamping device terminating in inwardly extending opposing fingers that project at right angles to the line of movement of said clamp when turned to a fastening position.

2. The combination with a jar provided with inclined ways, a cover and a clamp fastening means, the latter comprising a single continuous piece of metal coiled upon itself centrally at a point intermediate of its ends to provide an exclusive central bearing portion that diminishes in diameter under stress, said clamp fastening means also having arms extending in substantially the same plane in opposite directions, the outer portions of each arm being bent into a vertical plane, while the free ends of said arms are bent inwardly to form fingers to engage with the inclined ways at right angles to the inclination of the ways, substantially as described.

3. The combination with a jar provided with inclined ways, a cover and a fastening means, the latter comprising a single length of metal coiled upon itself to form a single turn centrally at a point intermediate of its ends to provide an exclusive central bearing portion that contracts in diameter when subjected to stress, and arms extending in substantially the same horizontal plane in opposite directions, the outer portions of each arm being bent into a vertical plane in substantial alinement with the convolutions of the single-turn coil, while the ends thereof are bent towards each other in a substantially horizontal plane to provide engaging fingers, substantially as described.

4. The combination with a jar provided with inclined bearing faces, of a cover having a central recess or bearing, and a fastener whose ends are bent in opposite directions to project inwardly towards each other, and whose central portion is looped in a single convolution to produce a central depending coil, to provide an exclusive central bearing, that contracts in diameter when subjected to strain, in the turning of said clamp, substantially as described.

5. The combination with a jar provided with inclined ways of a cover and a fastener, the latter comprising lever arms radially extending, whose ends are bent inwardly and in a manner to project towards each other in substantially the same plane, and whose central portion is looped in a single turn to produce a central coil that is adapted to bear centrally and exclusively on the cover and to yield in a manner to diminish its diameter and thereby increase the tension and resistance capacity of said coil, as well as to lengthen the lever-arms, substantially as described.

6. In combination with a jar body provided about its neck with an annular shoulder for the support of a cover and having a plurality of clamp lugs or projections provided with inclined bearing faces, a cover provided with a depending flange, adapted to rest on said annular shoulder, and a spring clamp extending diametrically over said cover and constructed with a coil, of a single turn, that is adapted to bear exclusively at a central point on the cover, and to be contracted in diameter when under stress, said clamping device being constructed and adapted to engage the under inclined surfaces of the clamp lugs at opposite sides of the jar, substantially as described.

7. The combination with a jar having inclined faces about its neck, of a cover, and a clamping device extending over and constructed with a coil of a single turn that is adapted to contract in diameter when subjected to stress, and that is adapted to have an exclusive central bearing on said cover, said clamping device being also constructed to provide fingers that engage the inclined faces on the jar, substantially as described.

In testimony whereof I affix my signature, in presence of two witnesses.

DALLAS KNOWLTON.

Witnesses:
JOSEPH W. BUELL,
H. M. STERLING.